(No Model.)
J. MACPHAIL.
BLANK FOR WHEEL RIMS.
No. 343,467. Patented June 8, 1886.
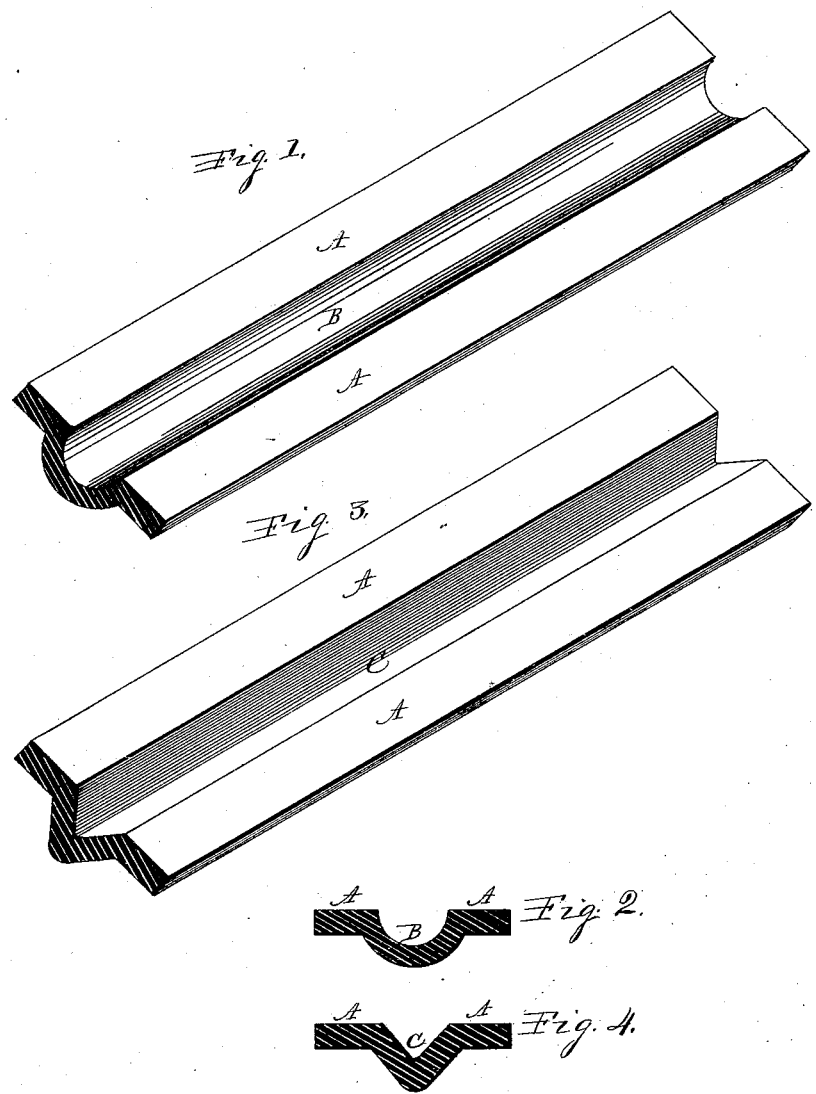

UNITED STATES PATENT OFFICE.

JAMES MACPHAIL, OF ROCKFORD, ILLINOIS.

BLANK FOR WHEEL-RIMS.

SPECIFICATION forming part of Letters Patent No. 343,467, dated June 8, 1886.

Application filed February 15, 1886. Serial No. 191,986. (No model.)

*To all whom it may concern:*

Be it known that I, JAMES MACPHAIL, a citizen of the United States, residing in the city of Rockford, in the county of Winnebago and State of Illinois, have invented a new and useful Felly - Blank, of which the following is a specification.

This invention relates to fellies employed in the manufacture of vehicle-wheels, but more particularly in the manufacture of a class of wheels known as the "tension-wheel," employed extensively in the manufacture of wheeled agricultural implements. In this class of wheels the fellies usually employed in the manufacture of wheels are generally omitted and the tire alone constitutes the rim of the wheel. To produce a felly for this class of wheel possessing great resistance and of light weight is the object of this invention.

In the accompanying drawings, Figure 1 is an isometrical representation of a portion of a bar forming my improved blank. Fig. 2 is a transverse section of the blank shown in Fig. 1. Fig. 3 is an isometrical representation of a bar, showing a modification of my improved blank; and Fig. 4 is a transverse section of the blank shown in Fig. 3.

My improved blanks from which to produce wheel-rims are produced in bar form, having their tread portions A formed on the edge portions of the bar and in the same plane, and their center portions, B, in Figs. 1 and 2, between the tread portions A, are concave, being depressed below the tread-surfaces, preferably in the segment of a circle, and the central depression in the blank forms a corresponding elevation on its inner face. This form of blank, when produced in wheel-rim form, having its meeting ends welded in the usual manner, is a rim of great sustaining-power in proportion to the amount of material contained therein, and in the construction of a wheel the concave center on its face receives the heads of the tension spokes within the face of the rim.

In the modification shown in Figs. 3 and 4 the depression C in the center of the outer face of the blank is produced in a more angular form than shown in Figs. 1 and 2, and by reason of its angular V form the same amount of material employed will rise to a greater height on its inner face, and consequently a felly produced from this form of blank will to some extent possess a greater power of resistance. Still other forms of the central depression differing slightly from the forms shown, but practically the same—such as a segment of an ellipse, a parabola, or a hyperbolic curve—may be employed and still be within the scope of my invention.

I claim as my invention—

1. A wheel-rim blank produced in bar form, having a central depression in its tread-face, substantially as and for the purpose set forth.

2. A wheel-rim blank produced in bar form, having a central depression in its tread-face, and the portions of its tread-face on each side of the central depression produced in the same plane, substantially as and for the purpose set forth.

JAMES MACPHAIL.

Witnesses:
S. A. D. BEHEL,
A. O. BEHEL.